UNITED STATES PATENT OFFICE.

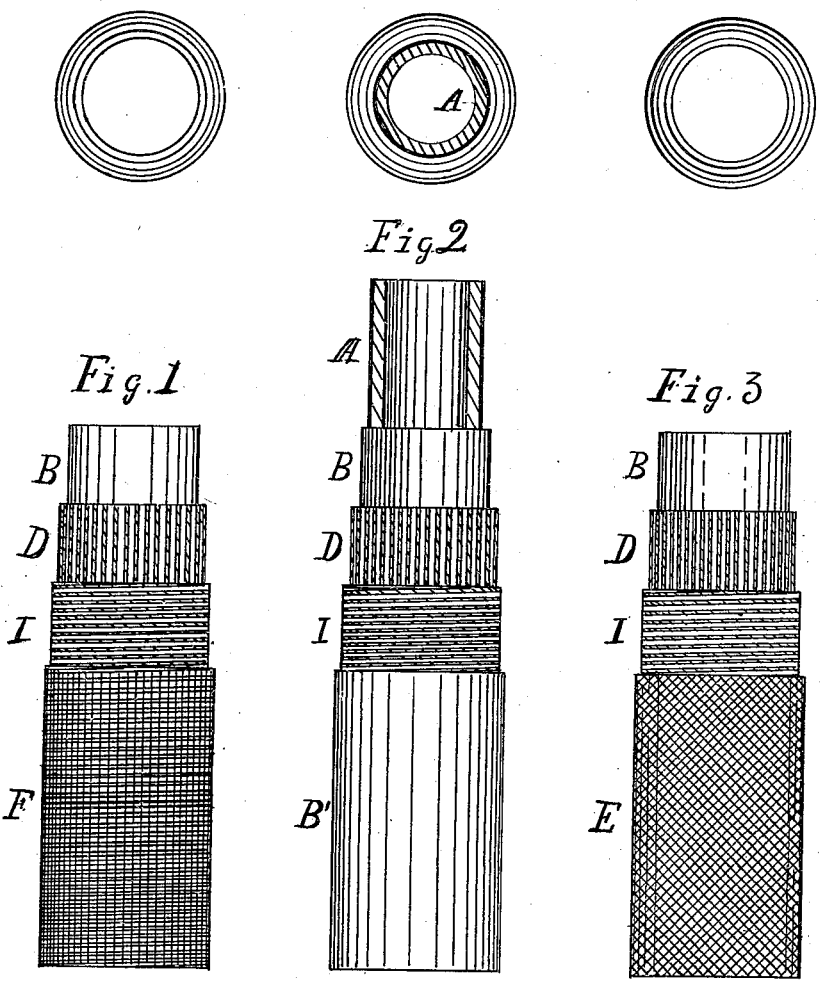

THOMAS L. REED, OF PROVIDENCE, RHODE ISLAND.

IMPROVEMENT IN MANUFACTURE OF WATER-PROOF HOSE.

Specification forming part of Letters Patent No. 184,907, dated November 28, 1876; application filed June 13, 1874.

*To all whom it may concern:*

Be it known that I, THOMAS L. REED, of Providence, in the county of Providence and State of Rhode Island, have invented certain new and useful Improvements in Water-Proof Hose, and the manufacture thereof; and I do hereby declare that the following is a full, clear, and exact description thereof, reference being had to the accompanying drawings, and to the letters of reference marked thereon, which form a part of this specification.

My said improvements relate to that class of water-proof hose which is composed of textile materials and waterproofing gums or gum compounds.

It is important that water-proof hose shall possess powers of resistance to bursting pressure of a far greater power than that to which it can ever practically be subjected under circumstances incident to its use. This is important to some degree, in that it gives security against bursting when in use under a pressure below that which it was originally intended to withstand.

It is an easy matter, however, to so construct hose which, when new, no pressure equal to that ever attained in its use can burst; but inasmuch as fire-hose is necessarily composed of materials particularly liable or subject to rotting and to the weakening which is incident thereto, the greater the power of new hose to resist pressure the longer its useful life will be, and therein lies the prime importance of having new hose of great strength. It is, of course, obvious that no strength can be attained in any structure greater than the strength of the materials of which it is composed, and therefore the only problem open to solution in this connection is the one involving the arrangement and distribution of the material so as to produce the strongest possible structure within a given quantity of material which is of a quality best suited for the purpose.

It is well known that uniformity in the strength of hose is all-important, for a weak spot therein is weakened more and more each time the hose is used in a greater proportion than the sounder parts; and a breach at any portion of a length renders the whole worthless, except, perchance, it be closely adjacent to the couplings, in which case a shorter length is made available by shifting the couplings.

When in use, hose is subjected to a uniform pressure in nearly all directions. It is also subjected to the tensile strain incident to reeling and unreeling, dragging, and ladder service, and also when filled with water under pressure; and a capacity to resist this strain should be specially provided, for the capacity for radial pressure is, however, to be particularly considered.

As a result of my invention, hose has been made which, I have reason to believe, had greater strength, and a consequent longer useful life, than any hose previously made embodying the same quantity of material of an equal quality.

In all woven hose, as heretofore made, there are, of necessity, longitudinal strands or warps; but these are interwoven with the filling, and are consequently of a greater length than the hose, and therefore they are not capable of contributing their full strength for resisting longitudinal strain until straightened so far as the filling-strands will permit.

In braided hose, as heretofore constructed, longitudinal threads or strands have also been employed, but only as in weaving in a mixed connection with other strands, and forming a part of the braided portion. Longitudinal threads or strands have also heretofore been employed for the purpose of drawing into a length of hose, however otherwise made, an unvulcanized-rubber lining; but, so far as my knowledge extends, such strands have only been of a size and strength, and in such numbers, as to merely secure the immediate results referred to, without contributing in any substantial manner to the strength of the finished hose.

One feature of my present invention consists in the combination, with an interior water-proof lining, of numerous independent longitudinal strands of strong material, closely laid outside the tube, and secured in position by an inclosing layer of any suitable textile material.

Another feature of my invention consists in the combination, with an interior water-proof lining, of independent longitudinal strands closely laid on its exterior, and an inclosing layer or layers composed of strands closely laid spirally; and, still further, in the combination, with the water-proof lining, of independent longitudinal strands closely laid thereon, a layer or layers of strands laid closely and spirally on the longitudinal strands, and a seamless woven or braided fabric tightly applied over the spiral strands.

To more particularly describe my invention, I will refer to the accompanying drawings, in which—

Figure 1 represents, in side and end view, a length of hose embodying my improvements, covered with a woven jacket. Fig. 2 represents the same covered with a rubber jacket, the hose being on a hollow arbor, such as I prefer to employ in its manufacture. Fig. 3 represents a similar length of hose provided with a braided jacket.

In manufacturing this or any other similar hose, I prefer to employ the method invented by me and secured by Letters Patent No. 125,331, dated April 2, 1872, of which it is only necessary herein to say that it involves, mainly, the use of a metallic arbor, hollow or otherwise, coated with any material which, while it affords a good foundation for an unvulcanized-rubber tube, and for the layers produced by weaving, winding, or braiding processes, will permit the free withdrawal of the arbor from the hose after the vulcanization of the lining.

In the drawings, A denotes the metallic arbor, which, in this instance, is shown to be tubular, for the internal admission of heat or steam during the vulcanizing process. B denotes a tube, of unvulcanized gum or gum compound, such as is usually employed in this connection, rolled in sheet form and applied to the arbor, with matched or slightly-overlapping but well-rolled edges. D denotes a series of independent longitudinal strands, which are applied to the exterior of the tube and embedded therein. I denotes a continuous strand, laid closely and spirally outside of the longitudinal strands, under such pressure as will cause them to lie in close contact with the longitudinal strands and such rubber as may protrude between them.

B' in Fig. 2 denotes a rubber jacket, applied directly over the spiral strands. E, Fig. 3, denotes an exterior jacket, of seamless braided fabric; and F, Fig. 1, denotes a seamless woven jacket.

Under my patented process, before referred to, the rubber portion of the hose is vulcanized on the arbor, and therefore during the fusion incident to the process the longitudinal strands and the overlying fabric, whatever it may be, are firmly united.

In my improved hose the rubber lining and the independent longitudinal strands, of requisite strength and closely laid, constitute, in whatever combination they may be employed, a distinctive feature of my invention.

It is obvious that these strands must be embedded in the lining, that they must be laid under accurate tension, and as straight as possible. This I believe to be impracticable without the use of the supporting-arbor, which affords a straining-point for the ends of the strands during the building up of the hose, and a foundation for the proper laying of the fabric which overlies these strands. Therefore I do not limit my invention to the spiral strand or stands in combination with the lining and the longitudinal strands, for I am well aware that a braided jacket may be applied directly over the independent longitudinal strands, (or, still better, a woven jacket,) and very desirable results attained.

As the spiral and longitudinal strands provide for the longitudinal and radial pressure, it is obvious that the rubber lining and the rubber cover, as shown in Fig. 2, will, when vulcanized solidly, unite the two layers of textile material without materially affecting their relations with each other; and it will be seen that the entire strength of said textile material is rendered available, and that all the strands may be laid under a maximum of tension and practically uniform.

Having thus described my invention, I claim as new and desire to secure by these Letters Patent—

1. The combination, with a vulcanized-gum lining, of the series of independent longitudinal strands, laid straight and closely outside the lining, and an inclosing layer of textile fabric, which is united by the vulcanized gum with the longitudinal strands, substantially as described.

2. The combination, with a vulcanized-gum lining, of independent longitudinal strands, applied outside of the lining, a strand laid closely and spirally outside the longitudinal strands, and an inclosing layer of suitable material, substantially as described.

3. The combination, with a vulcanized-gum lining, of the independent longitudinal strands next to the lining, the closely-laid spiral strand over the longitudinal strands, and the seamless braided or woven jacket, substantially as described.

In testimony that I claim the foregoing as my own I affix my signature in presence of two witnesses.

THOMAS L. REED.

Witnesses:
HENRY MARTIN,
JOHN C. PURKIS.